Aug. 21, 1956 W. A. REENSTRA 2,760,004

NUMBER GROUP CIRCUIT

Filed Feb. 2, 1953 4 Sheets-Sheet 1

INVENTOR
W. A. REENSTRA
BY J. W. Schmied
ATTORNEY

INVENTOR
W. A. REENSTRA
BY J W Schmied
ATTORNEY

Aug. 21, 1956 W. A. REENSTRA 2,760,004

NUMBER GROUP CIRCUIT

Filed Feb. 2, 1953 4 Sheets-Sheet 3

INVENTOR
W. A. REENSTRA
BY
J. W. Schmied
ATTORNEY

Aug. 21, 1956 W. A. REENSTRA 2,760,004

NUMBER GROUP CIRCUIT

Filed Feb. 2, 1953 4 Sheets-Sheet 4

INVENTOR
W. A. REENSTRA
BY J. W. Schmied
ATTORNEY 2,760,004

NUMBER GROUP CIRCUIT

Willard A. Reenstra, Rutherford, N. J., assignor to Bell Telephone Laboratories, Incorporated, New York, N. Y., a corporation of New York Application February 2, 1953, Serial No. 334,527

16 Claims. (Cl. 179—18)

This invention relates to number group circuits and more particularly to germanium diode number group circuits particularly adapted for use in conjunction with talking path switching networks.

Briefly, in accordance with this invention an improved telephone switching arrangement is provided which operates semiautomatically for establishing paths between a calling subscriber's station and a called subscriber's station under control of an operator. The operator responds to each call from a subscriber's line, in response to the lighting of a lamp, and connects the operator's telephone set to the calling subscriber's line to determine the called subscriber's number. The operator then examines the calling and busy lamps of the called subscriber's line, and if the line is idle, the operator sets a plurality of manual switches first in accordance with the number of the called subscriber's station, then in accordance with the number or designation of an idle local transmission circuit. The operator thereafter operates a start or connect key causing the called subscriber's line to be connected to the designated transmission circuit.

The switching network between the called subscriber's line and the transmission circuit or trunk utilizes a plurality of transistor triggering units as talking path crosspoints as described in the copending application Serial No. 334,552 of B. G. Bjornson and E. Bruce, filed on the same date herewith. The present invention utilizes a germanium diode number group circuit consisting of a line marking circuit, a trunk marking circuit and a trunk path release circuit. These circuits are particularly adapted to operate in conjunction with the transistor switching network which functions under control of relatively small voltages, and comprise a plurality of germanium diode gates. A gate is defined as a circuit or apparatus which is capable of opening and closing a signaling or control path between other elements and is therefore essentially a switch.

The diode gates utilized in the present invention are "and" or coincidental gates having a plurality of input leads and one output lead. The output lead is activated only if all the input leads are activated and the input leads are activated in accordance to the setting of the manual switches set by the operator. When the operator therefore operates the start key, a particular line marking circuit and transmission line circuit is selected. The line marking circuit corresponds to the called subscriber's line.

Thereafter, the operator will operate switches or keys or dials in accordance with the number or designation of the calling subscriber's station and a number designating the same transmission circuit. The line marking circuit corresponding to the calling line and the trunk marking circuit associated with the trunk marking circuit selected by the first sequence of operations are thereby selected. Upon reoperating the start key, the called subscriber's line is connected with the calling subscriber's line and the operator may thereafter operate a ringing key to ring the called subscriber's bell. At the termination of a call the operator, upon observing a disconnect lamp, will again operate switches in accordance with one or the other of the subscriber's number and then operate a disconnect key. Thereafter the operator will operate the switches in accordance with the other subscriber's number and again operate the disconnect key, which operations cause the established path between the two subscribers to be interrupted and restored to normal.

Alternatively, the operator may disconnect the subscriber's lines by operating her keys in accordance with the numbers of the transmission circuits and thereafter operate the disconnect key which in turn causes each of the paths through the switching equipment from the transmission circuit to the subscriber's line to be interrupted and the circuits restored to their idle or normal condition.

It is then an object of the present invention to provide for novel circuits utilizing germanium diodes for marking the inlets and outlets of a switching network.

Still another object of the present invention is the provision of novel apparatus for disconnecting or interrupting an established path through the system which comprises applying a predetermined voltage condition to one end of an established path through the switching network.

Still another object of the present invention is to provide improved methods, circuits and apparatus for establishing connections through switching networks in which transistors employed for selecting a path through the network are also employed to convey the intelligence or telephone voice currents through the network.

Still another object of the present invention is to provide diode marking circuits having a substantially constant output in spite of variations in impedance of the diodes.

Still another object of the present invention is the provision of a germanium diode number group circuit which functions to select and mark the line and trunk ends and release the trunk end of a transistor switching network.

Still another object of the present invention is the provision of a marking gate for each line and trunk and a release gate for each trunk where the release gates and marking gates at the trunk are operable by similar pulses.

Still another object of the present invention is the provision of a novel polarity sensitive differentiating circuit to place a correct polarity release pulse upon the trunk of a switching network to be disconnected.

Still another object of the present invention is the provision of a low voltage control circuit for a transistor switching network.

Further object, features and advantages of this invention will become apparent to those skilled in the art upon considering the following description when read with reference to the attached drawings in which:

Figs. 1, 2, 3 and 4 show in detail a few exemplary circuits embodying the present invention;

Fig. 5 shows the manner in which Figs. 1, 2, 3 and 4 are positioned adjacent each other; and Fig. 6 is a graph illustrating the voltage current relationship of a suitable transistor crosspoint which includes positive feedback.

Figure 1:
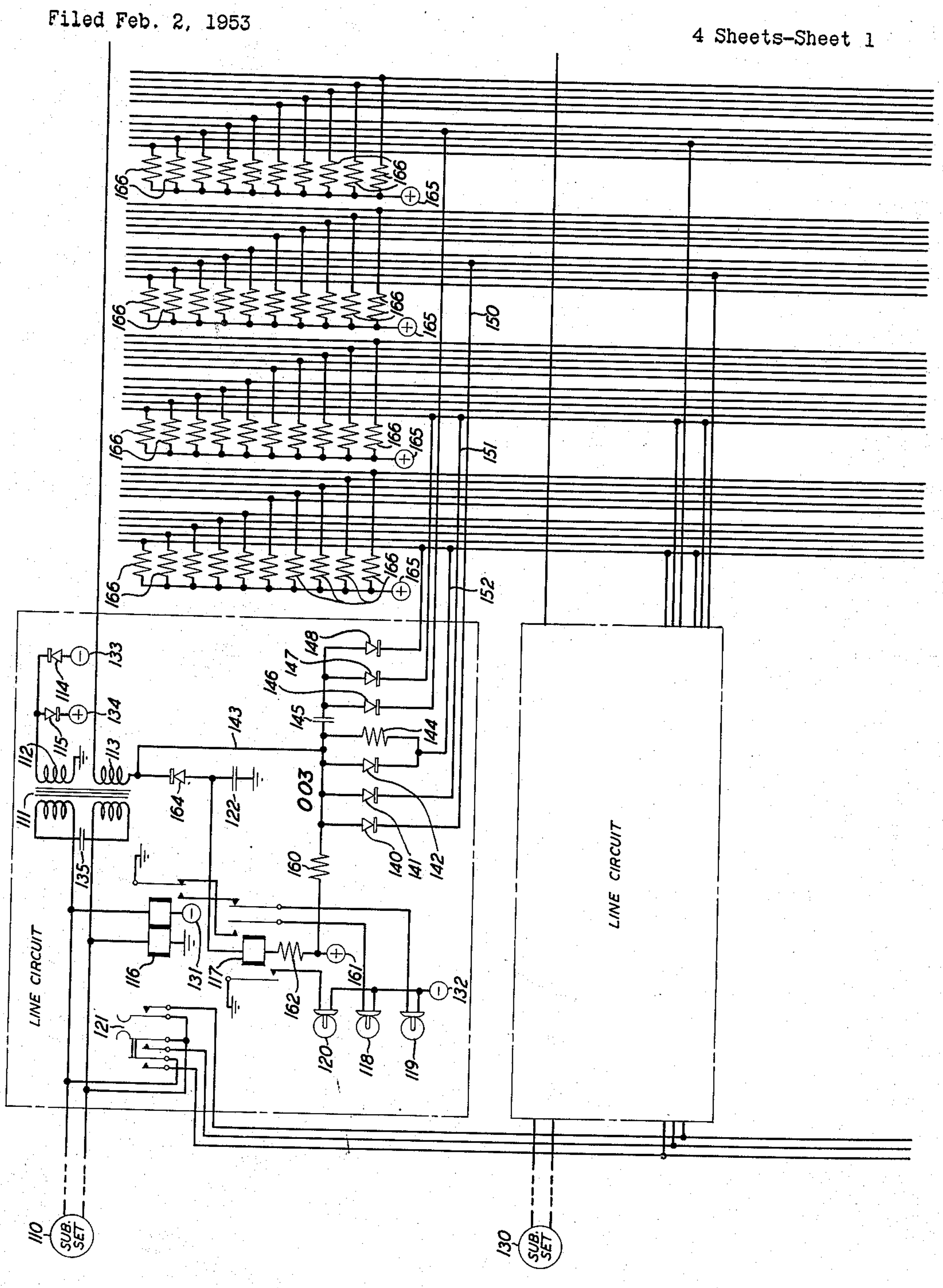
Figure 2:
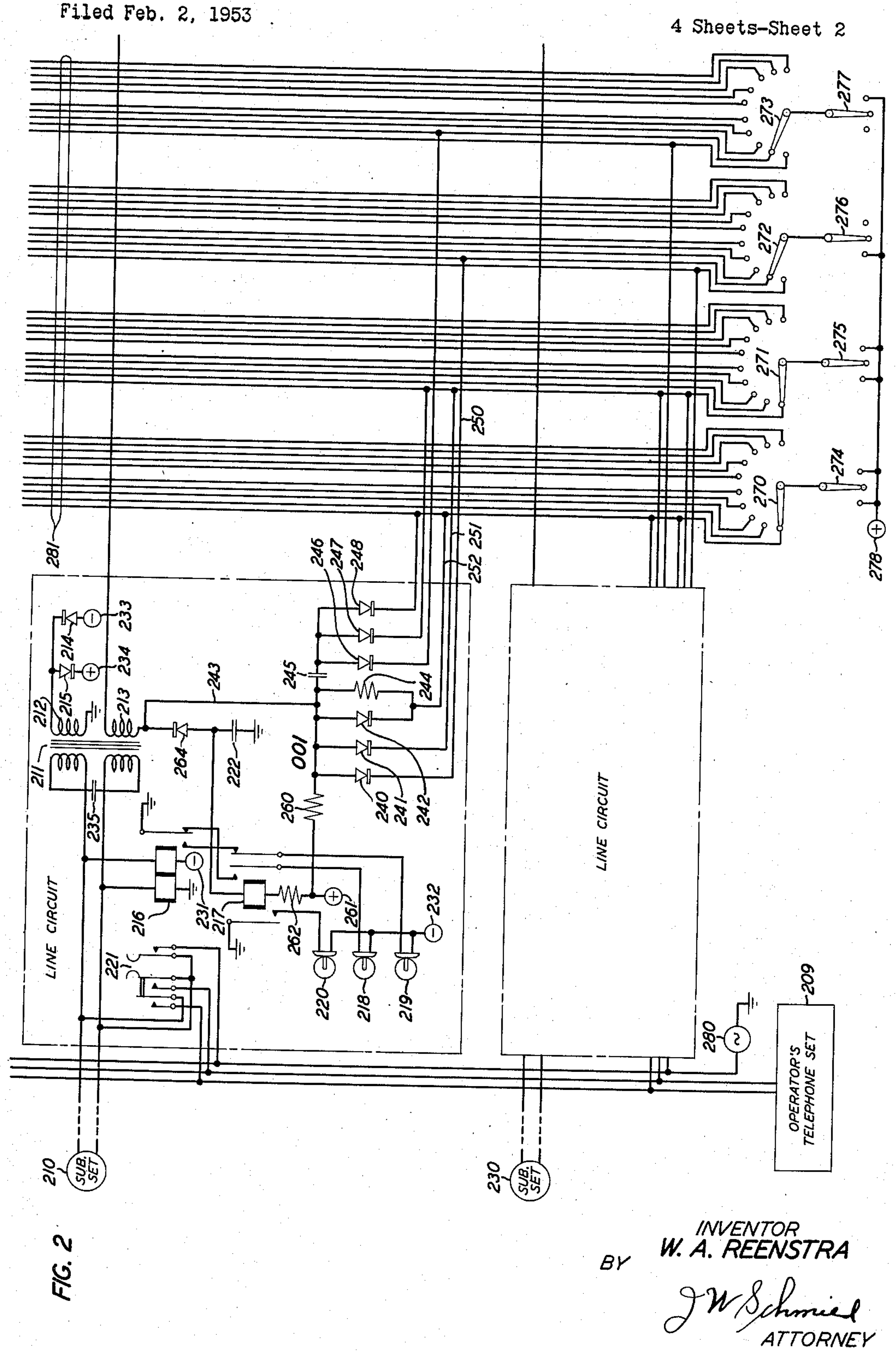
Figure 3:
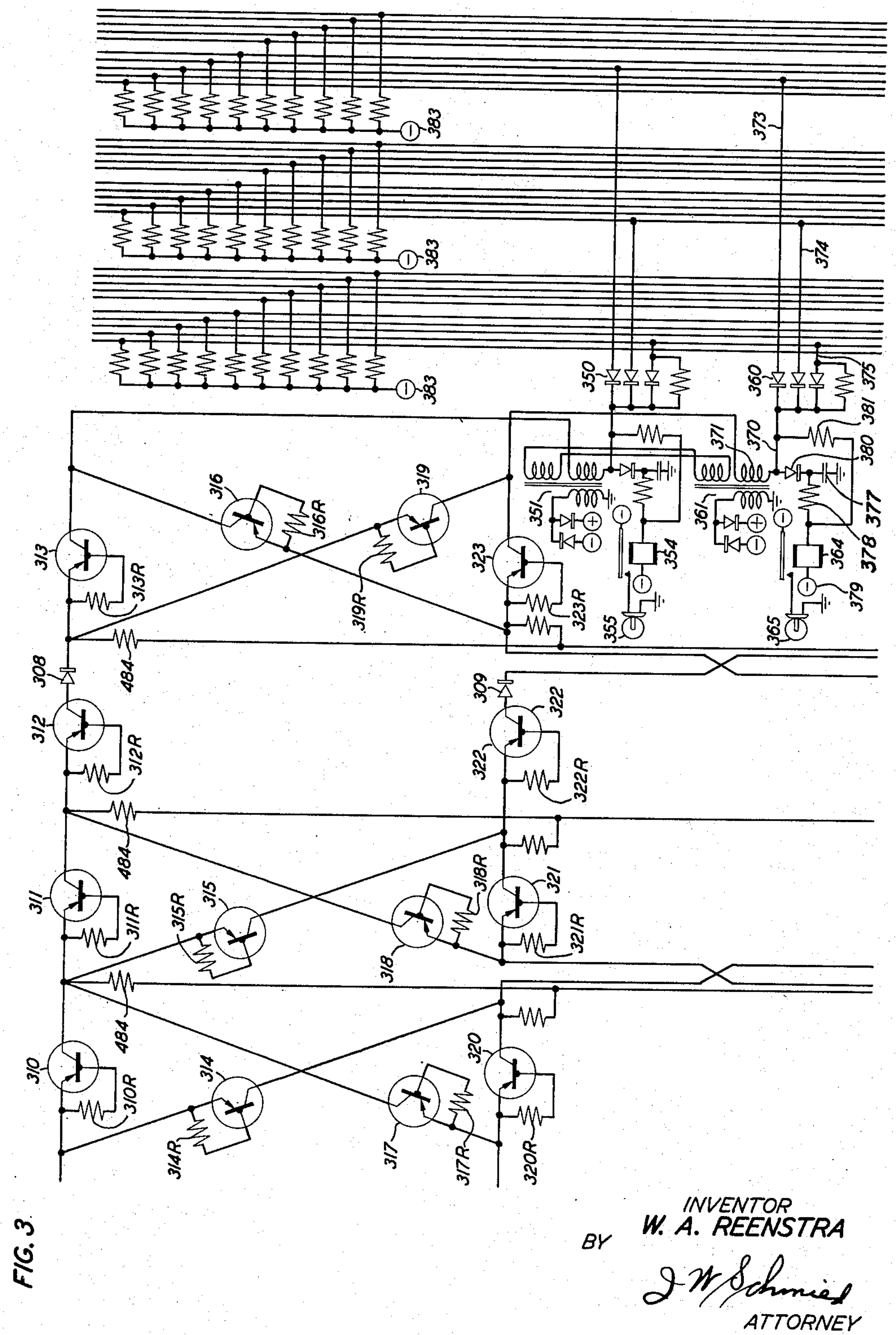
Figures 4, 5, 6:
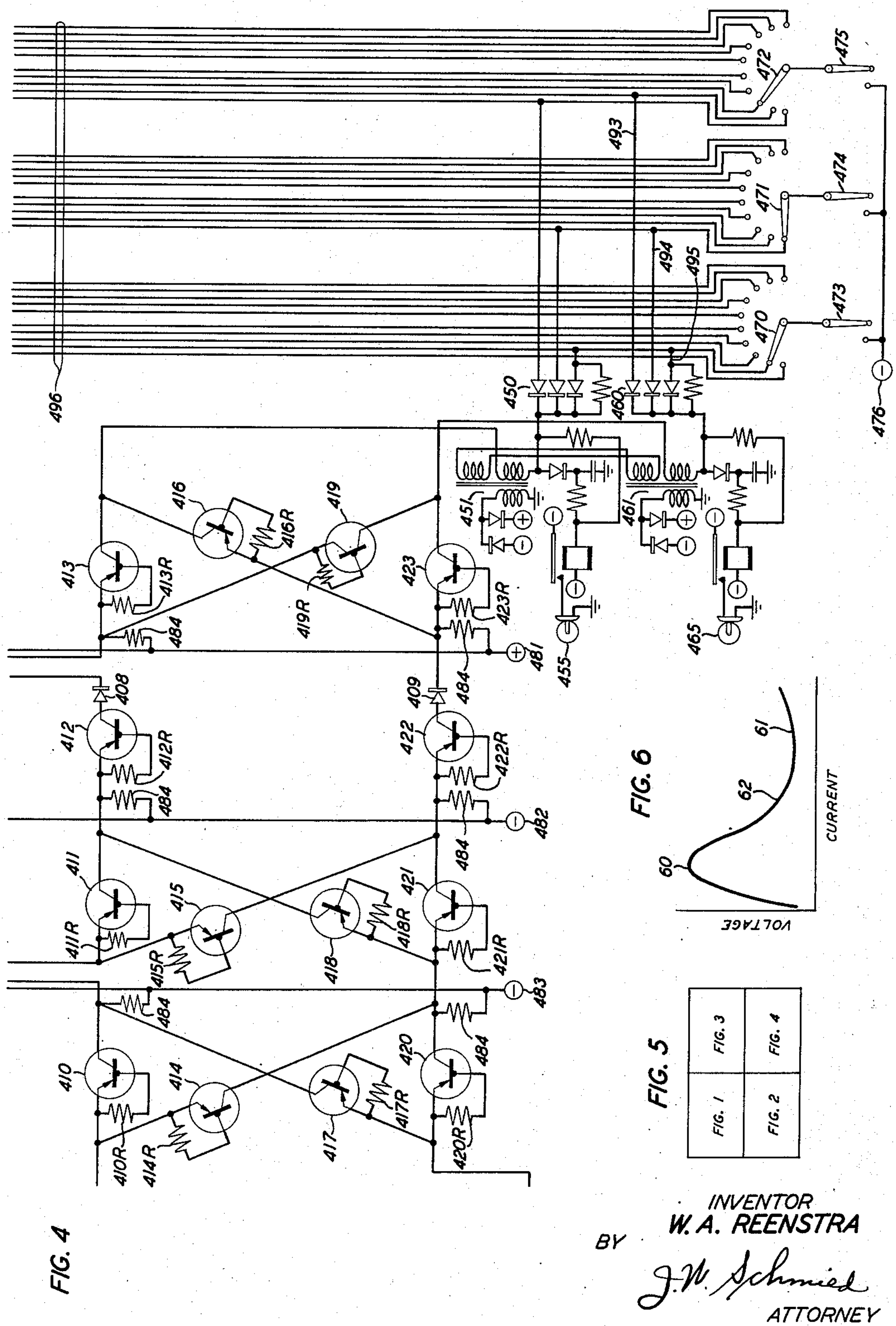

Figs. 1, 2, 3 and 4, when positioned adjacent one another in accordance with the arrangement shown in Fig. 5, disclose the circuit details of representative lines and two common transmission circuits of an automatic telephone switching arrangement embodying the present invention. These circuits are representative of many more similar types of circuits with a subscriber's line circuit and related equipment being provided for each of the subscribers or each party line and sufficient transmission circuits being provided to permit a maximum simultaneous busy hour number of calls to be established through the system. The two transmission circuits shown are for intraoffice calls, but similar circuits may be provided for interoffice calls when one end of such circuits terminates at one switching center, or central office, and the other end terminates at another office.

Each subscriber's line has connected to it a line relay such as 116 for the subscriber's station 110, a transformer 111 for transmitting voice currents and an operator's or supervisor's key 121. Key 121 may be operated from its normal position in one direction so that the left-hand set of contacts is closed, in which position the operator's position circuit and telephone set 209 are operatively associated with the subscriber's line. When the key 121 is operated in the other direction, the right-hand set of contacts is closed which causes ringing current to be applied to the subscriber's line from the source 280. Each of the other subscribers' stations, such as 130, 210 and 230, is similarly provided with terminal equipment. In addition, each subscriber's line is provided with a group of supervisory lamps, such as 118, 119 and 120. Lamp 120 is a busy lamp and lights, as is hereinafter described, at all times during which the subscriber's line is busy and connected to another subscriber; lamp 119 is a calling lamp and lights, as is hereinafter described, each time a subscriber initiates a call; and lamp 118 is a disconnect lamp and lights, as is also hereinafter described, at the termination or abandonment of a call and indicates that the previously established connection from the subscriber's line should be interrupted and returned to normal.

Each subscriber's line has individual to it a group of semiconductor diodes, such as 003, for the subscriber's station or line 110, or 001 for the line 210. These diodes are a part of a line number group and are employed to selectively establish connections to the respective lines, as will be hereinafter described. A common transmission circuit is shown in Figs. 3 and 4 which utilizes the trunk number group with its groups of semiconductor diodes 350, 360, 450 and 460 for selectively establishing connections to this transmission circuit and to the transmission transformers 351, 361, 451 and 461 and busy lamps 355, 365, 455 and 465. The transmission circuit shown in Fig. 4 is similar to the transmission circuit shown in Fig. 3. Figs. 3 and 4, in addition, show a transistor switching and transmission network having a plurality of two-terminal transistor devices 310 through 323 and 410 through 423. The transistors shown in this network are merely representative of a large number of similar transistors employed enabling connections to be established between any two subscribers' lines terminating at the switching center represented by Figs. 1 through 4. The transistors shown in Figs. 3 and 4 are arranged in four stages with the first stage on the left being commonly referred to as the primary line switch stage, the second stage or column from the left being referred to as the secondary line switch or line frame stage, the third column from the left being referred to as the secondary trunk switch or switch frame stage, and the last stage on the right being referred to as the trunk primary frame or switch stage. These stages and the operation of the transistors included therein will be hereinafter described in detail. In order for the operator to establish and interrupt transmission paths through the system, briefly described above, a series of switches or registers shown across the bottom of Figs. 2 and 3 are utilized. These switches and the operation thereof will also be hereinafter described.

In order to illustrate the operation of the circuit, as shown in Figs. 1 through 4, assume that the subscriber at station 110 wishes to communicate with or call a subscriber at station 210. When the subscriber at station 110 lifts the receiver or handset the contacts in the subscriber's set are actuated in a manner well known in the art to close a direct-current path between the two line conductors of the subscriber's line. The direct-current path is from the battery 131 through the right winding of line relay 116, over the subscriber's line and back to ground through the left winding of relay 116. Relay 116 in this manner operates and closes thereby a circuit for lighting the calling lamp 119 from ground through the operated contact of relay 116 and the normal contact of relay 117 to battery 132 through the calling lamp 119.

The operator at the switching station, upon observing the lighted lamp 119, operates the talking key 121 associated with this lamp to close its left-hand contacts and thereby connect the operator's telephone circuit 209 to the subscriber's line extending to station 110. The operator will then inquire as to the number desired by the subscriber, observing the calling and busy lamps of the called subscriber's line, and if the line is idle, will operate selector switches 270, 271, and the common pair 272 and 273 in accordance with the identity of the hundreds digit, tens digit and units digit, respectively, of the desired subscriber's line. Assuming that the line to station 210 is idle, the respective calling and busy lamps 220 and 219 will be extinguished and the operator thereupon sets the switches 270 through 273 in accordance with the number 001 which is assumed to be a directory number assigned to station 210. The switch 273 is set in accordance with the units digit of the directory number, as is the switch 272, but functions however only during the disconnect sequence of operations, as is hereinafter described. The setting of switches 270 through 273 selects the called subscriber but the operator has to select an idle circuit from the calling to called subscriber through the switching networks shown in Figs. 3 and 4. The operator therefore observes the common communication circuit busy lamps 355, 365, 455, 465, etc. and selects an idle circuit such as the one, for example, associated with the busy lamp 365. The operator thereupon operates the keys 470, 471 and 472 in accordance with the number assigned to this transmission circuit which is assumed to be 102 in the specific arrangement disclosed in Figs. 3 and 4. The switches 470, 471 and 472 are shown in this position and the switches 270 through 273 are shown in a position, as described above, corresponding to the number 001.

With the switches 270 through 273 set in accordance with the number of the called subscriber's station and switches 470 through 472 set in accordance with the number of an idle trunk circuit, the operator operates a start or connect key which comprises the switch elements 274 through 277 and 473 through 475. These elements may be individually operated or they may be operated in groups or they may be all operated from one manually operated key or from one or more relays which in turn are simultaneously operated from a manually operated key.

The operation of the switch elements 274 through 277 to the left by the operator connects the plus 12-volt battery 278 to the semiconductor diode groups 001, 003, etc. causing one of the groups 001, 003, etc. to apply the breakdown initiating condition or an operating condition, as is hereinafter described, to a point in the switching network shown in Figs. 3 and 4. The operation of the switches 473 through 475 connects the minus 12-volt battery 476 and similarly causes one of the semi-conductor diode groups 350, 360, 450, 460, etc. to apply a breakdown initiating condition to the switching network. In the specific exemplary embodiment of Figs. 1 through 4 the diode groups 001, 003, etc. which may be representative of one thousand diode groups and the diode groups 350, 360, 450, 460, etc. which also may be representative of one thousand groups are "and" circuits or gates. In the "and" or coincidental circuit or diode group circuit 001, for example, the diodes or varistors 240, 241 and 242 are poled in such a manner so that the output lead 243 can never assume positive potential appreciably above the least positive input lead 250, 251, or 252. The leads are connected respectively to the contacts of the switch elements 272, 271 and 270 through the bus bars 281. The bus bars 281 are normally maintained at the biasing potential of plus 5 volts by the batteries 165 through the resistors 166. Since the input leads 250 through 252 are at plus 5 volts when inactivated, and the resistance 260 is large in comparison with the forward resistance of the varistor or rectifier units 240 through 242, the potential of the output lead 243 remains close to plus 5 volts as long as any of the input leads 250 through 252 are inactivated. The input leads 250 through 252 are activated from the plus 12-volt battery 278, described above, and when all three are activated thereby the potential upon the output lead 243 rises to a point to approximately plus 9 volts. The exact positive potential which the output lead 243 may reach depends upon the voltage dividing action of resistance 260, and the parallel combination of the back impedances of rectifiers 240 through 242 and the resistance 244. Power to the output lead 243 is supplied from the batteries 278, 261 and 165. The battery 261 connected to resistor 260 has a potential source of plus 5 volts and supplies, as is hereinafter described, the sustaining potential for the switching network shown in Figs. 3 and 4.

The semiconductor diode 242 is shunted by a resistor 244 which has a resistance that is small compared to the average back resistance of the diodes 240 through 242 but large compared to the forward resistance of these diodes. By using a proper value for the resistor 244 it is possible to produce an output voltage amplitude upon lead 243 within close tolerance ranges while using semi-conductor diodes which have back resistances that vary by a factor of ten to one. The discharge, marking, or breakdown potential of approximately plus 9 volts upon the lead 243 is applied through the winding 213 of the transmission coil 211 to the transmission circuit or network of Figs. 3 and 4. The inductance and resistance of winding 213 serve as lock-out elements, as is well known in the art, permitting only one path to be established through the transmission network of Figs. 3 and 4.

In the specific embodiment disclosed herein the diode groups 001 and 003 represent one thousand numbers since each diode group has a hundreds, tens and units diode. The present invention is not necessarily restricted to this specific embodiment as any number of diodes may be utilized in a number group and thus any number of calling lines may be controlled.

The diode group circuits 001, 003, etc., described above, used for marking the called line are essentially duplicated at the trunk selecting end by the diode groups 350, 360, 450, 460, etc. This trunk number group differs however in that negative instead of positive voltages are applied on the input information digit leads and a negative output marking voltage is applied to the trunk end of the switching network. For example, when the switches 470, 471 and 472 are set in accordance with the digits 102, the minus 9 volts due to the voltage divider action in the diode gate from the minus 12-volt battery 476 are connected through the diode group 360 and the transmission coil 361 to the transistor switching network. The battery 476 is connected through the switches 473, 474 and 475 and the selectors 470, 471 and 472 to the input leads 373, 374 and 375 of the trunk diode group 360. The selector 470 connects the minus 12 volts to the one hundred diodes such as 375, 495, etc. of the diode groups 360, 460, etc. that represent numbers having a "1" in the hundreds place. The selector 471 connects the minus 12 volts from battery 476 to one hundred diodes of numbers corresponding to a "0" in the tens place, but only ten of these are also in the same group as the one hundred diodes of numbers corresponding to "1" for the hundreds place. The selector 472 selects one hundred numbers corresponding to "2" in the units place and thus narrowing the selection to the one group corresponding to the number 102 which is the diode group 360. The minus 12 volts applied to the three input leads 373, 374 and 375 cause the potential upon output lead 370 to decrease from minus 5 volts to approximately —9 volts.

In this manner the diode group circuits 001 and 360 select the two terminal points of the transistor switching network between which it is desired to establish a connection. The marking potentials applied to the leads 243 and 370 are relatively high voltages and successively initiate the selection of a single path from one of the leads to the other.

The transistors 310 through 323 and 410 through 423 used in the switching network have a characteristic illustrated in Fig. 6 which shows the relationship between the voltage across a cross-point or transistor and the current through it. As the current through the cross-point rises the voltage across the cross-point also rises until the breakdown potential of 10 volts at point 60 is reached. When the breakdown potential of 10 volts is reached the voltage across the cross-point rapidly decreases as the current continues to increase. This region of decreasing voltage with increasing current is frequently referred to as a negative resistance region and commonly occurs in transistors between currents of approximately 0.3 milliampere and 1 milliampere. After the latter current value is reached, the voltage across the cross-point levels off and then increases slightly as the current further increases. The base resistance provides for the relatively high ratio between the breakdown potential at point 60 and the sustaining potential at point 61. With a base resistance value of approximately 800 ohms, the ratio between the breakdown and sustaining potentials is approximately six to one. The small resistance or relatively negligible resistance between the emitter and collector causes the relatively flat sustaining portion of the curve shown in Fig. 6 in the vicinity of point 61. Placing a larger resistance in the emitter lead would cause a larger slope in this positive resistance region. Some examples of transistors which may be used in the transistor switching network, described above, are disclosed in Patent No. 2,586,597 to J. Bardeen and W. H. Brattain. In order to secure satisfactory working ranges and limits it is necessary that the breakdown and sustaining potentials be relatively far apart. It is desirable, in other words, that the voltage required to break down the transistor cross-point or cause it to enter its negative resistance region should be appreciably greater than the voltage across the cross-point required to maintain a substantial current therethrough. Moreover, it is highly desirable that the operating characteristics of each of the several transistors be as nearly similar to the operating characteristics of the other transistors. It is also desirable that battery variations and variations in the values of the other circuit elements and parameters be as small as practicable in order to secure the greatest operating margin.

After the setting of the switches 270 through 273 and 470 through 472 and the application of the marking potentials from batteries 278 and 476, as described above, approximately plus 9 volts appear at the emitters of the transistor cross-points 410 and 414 and approximately minus 9 volts appear at the collectors of the transistor cross-points 319 and 323. The junction between the primary and secondary trunk stages, as is hereinafter described, is maintained at a positve potential by the plus 3-volt battery 481; the junction between the secondary line and trunk stages is maintained at a negative potential by the minus 5-volt battery source 482 and the junction between the primary and secondary line stages is kept at a negative potential by the minus 3-volt potential source 483. The batteries 481, 482 and 843 are connected to these junctions through a plurality of resistors 484 so that when no current flows through any of the cross-points 310 through 323 or 410 through 423, etc. the junction points between the cross-points are at potentials in accordance with the batteries 481 through 483. The junction, for example, between the transistor cross-points 410 and 321 is at a potential of minus 3 volts.

The transistors require a potential between the emitter and collector of plus 12 volts to enter the negative resistance region as described above and as shown in Fig. 6. With plus 9 volts applied from the diode group 001 to the emitter of the transsistor cross-point 410 and minus 3 volts applied to the collector from the battery 483, the transistor cross-point 410 breaks down. When the transistor cross-point 410 conducts the voltages thereacross reduce to a potential of approximately 2 volts so that the potential on the collector of transistor 410 increases to approximately plus 7 volts. The voltage across the resistor 484 connecting this junction to the battery 483 rises to approximately 10 volts. The resistances 484 in series with the paths to the potential sources 481 through 483 are sufficiently high so that the current through any cross-point is restricted to the negative resistance region described above as at point 62 in Fig. 6. There is a resistor 484 individual to each of the transistors 310 through 323 and 410 through 423. This restriction by the resistors 484 prevents lock-out from occurring and permits breakdown, as is hereinafter described, of all cross-points extending to idle junctions. The limiting resistors 484 are individual to each cross-point so that all possible idle cross-points or paths are marked. The lock-out phenomenon can only take place in circuits having little or no resistance or impedance individual to the respective transistors and lock-out occurs only when impedance of the circuit external to the transistors is substantially common to the transistors among with the lock-out is desired. If either of the transistors 410 or 414 in the primary line stage is connected to a cross-point in the secondary line stage that is busy or being utilized for another call, the collector potential will be insufficient, as is hereinafter described, to cause breakdown therethrough. In the illustrative example described herein the transistor 414 breaks down in a similar manner as the transistor 410, and its collector rises from a potential of minus 3 volts to a potential of plus 7 volts. The collector of the transistor 410 is connected to the emitters of transistors 318 and 321 and the collector of transistor 414 is connected to the emitters of transistors 418 and 421.

When the potential on the emitters of the transistor cross-points 321, 318, 421 and 418 increases from minus 3 volts to plus 7 volts, these transistors in turn break down as their collectors, as described above, are at a potential of minus 5 volts from battery 482 and thus 12 volts appear thereacross. At the same time that the cross-points 410 and 414 break down, a similar action takes place in the trunk stage where the cross-points 319 and 323 break down. The minus 9 volts on lead 370 are connected to the collectors of the cross-points 319 and 323 through the winding 371. The emitters of the transistor cross-points 319 and 323 are at a potential of plus 3 volts due to the battery 481 described above. The 12 volts from emitter to collector cause the transistor cross-points 319 and 323 to break down in a manner described above in reference to the transistors 410 and 414.

Although any stage or group of transistors may have been made to operate as the final selecting stage, under the assumed voltage conditions, described above, the third column or the secondary trunk stage is employed as the final selecting stage. This stage is employed to select one of the many possible paths between the two terminal points from the diode groups 001 and 360. When the first, second and fourth stages from the left have functioned to break down the selected transistors located therein, the voltage applied to the emitter side of the third column is plus 5 volts and the voltage applied to the collector side is minus 7 volts. This voltage difference of 12 volts is sufficient to initiate the breakdown through idle transistors of the third column which are connectable through transistors of the other columns to the diode groups 001 and 360. One path from the line terminal group 001 is through the transistors 410, 318, 312 and 319 to the trunk diode group 360 and another path is through the transistors 414, 418, 412 and 323 and breakdown initiating potentials are therefore applied to the two transistors 312 and 412. The two paths however, described above, extend to the diode groups 001 and 360 through the inductance of the lower right-hand windings 213 and 371 of the coils 211 and 361. This inductance and the related circuit resistance are substantially all of the impedance in series with the transistor paths, described above, and therefore operate as a lock-out impedance element. When breakdown or conduction commences through one of the transistors 312 or 412, the voltage drop across the inductance of the windings 213 and 371 causes the voltage to rapidly reduce so that breakdown is not commenced through any of the other transistors in the third column, since the total circuit impedance reduces, the current through the selected path, for example comprising the transistors 414, 418, 412 and 323, rises to a much higher value than that corresponding to point 61 on the positive resistance portion of the curve of Fig. 6. The voltage drop across each of the selected transistors is at this time approximately 2 volts so that the switching network requires a sustaining potential of 8 volts thereacross. Since the switching network is symmetrical the junction point between the transistors 418 and 412 will be substantially at ground potential.

With a potential of 2 volts across each of the transistors 414, 418, 412 and 323, these transistors will test busy to other transistors which may attempt to establish a path through the system. Since an insufficient voltage will be supplied to these other transistors, as is hereinafter described, the established path is therefore not disturbed or interfered with by later attempts to establish other paths through the switching network. For example, with 2 volts across the transistors in the selected path, the junction in this path between the first and second stages from the right will be at a potential of plus 2 volts. If the terminal to transistors 417 and 420 is subsequently marked, the transistor 420 cannot break down as the existing potential thereacross will only be 7 volts instead of the required 12. The transistor 417, however, will break down if its collector is at a potential of minus 3 volts due to the battery 483. The same or similar conditions exist between all of the other possible alternative paths to the path comprising transistors 414, 418, 412 and 323. If the path and the individual sections of transistors or cross-points thereof thus in effect test busy for such potentials applied to them then other transistors connected to this path will not break down.

The sequence of operations, as described above, occurs when the operator actuates the switch elements 274 through 277 and 473 through 475 to the left-hand or connect position. When the operator returns or restores the switch elements to their middle or neutral position, the voltages applied from batteries 278 and 476 are removed and the bus bars 281 and 496 restore from plus and minus 12 volts to plus and minus 5 volts, respectively. The 5-volt potentials are due to the normal biasing batteries 165 and 383, described above. Upon the restoration of the switch elements 274 through 277 to their normal or neutral position, the relays 217 and 364 operate. When the plus 9 volts from battery 278 are removed from the bus bars 281 the potential upon output lead 243 from the line diode group 001 falls from plus 9 volts and allows the diode 264 to unblock a path from the sustaining potential source 261, resistor 262 and relay 217 to the switching network. The diode 264 is connected in series with the winding of relay 217 and is poled so as to oppose the flow of current from the output lead 243 when the output lead is higher than plus 5 volts. When the voltage is at its plus 9-volt value the diode 264 reduces the current through output lead 243 and relay 217 to battery 261. Substantially all of the current through the output lead 243 is therefore available to control the establishment of a path through the switching network. When the plus 9 volts are removed from the output lead 243 the diode 264 does not materially effect or interfere with the flow of current through relay 217 and the transistor cross-points. The operation of relay 217 closes an operating path through the busy lamp 220 and the disconnect lamp 218. Similarly on the trunk side the relay 364 operates from the minus 5-volt battery 379 through resistor 378 and diode 380 from the switching network. The operation of relay 364 operates the busy lamp 365 to indicate to the operator that the transmission circuit associated with the trunk diode group 360 which is designated by the number 102, as described above, is busy.

When the switches 274 through 277 and 473 through 475 are restored to their neutral position and the bus bars 281 and 496 change their potentials from plus and minus 12 volts to plus and minus 5 volts, respectively, the transistors that were selected but are not part of the selected path restore to normal. For example, the transistor 319 triggered when minus 9 volts was applied to its collector and plus 3 volts was applied to its emitter. The potential upon the emitter changed from plus 3 volts to minus 7 volts after breakdown with 10 volts appearing across its corresponding resistor 484 connected to the battery 481. As long as the minus 9 volts is impressed upon its collector, the transistor 319 remains conducting or broken down. When the potential upon the bus bars 496 and correspondingly upon the collector of transistor 319 increases from minus 9 volts to approximately minus 5 volts the transistor 319 restores to normal. The other partial paths or transistors similarly restore to their idle or normal condition wherein they may be employed to establish other connections. The interruption of the paths to the batteries 278 and 476 merely causes the current flowing through the transistors 414, 418, 412 and 323 to reduce to that corresponding to point 61 in Fig. 6. The values of the resistors 262, 260, 378, 381 and the resistance of the relays 217 and 364 are chosen so that the total current flowing through the selected transistors is approximately 8 milliamperes. Thereafter current conditions through the selected path remain substantially the same during the time the connection is established.

The operator thereafter operates the switches 270 through 273 in accordance with the number assigned to the calling station 110 which, in the specific embodiment disclosed herein, is 003. The operator also operates the selector switches 470 through 472 in accordance with the number assigned to the other end of the transmission circuit which, in the exemplary embodiment set forth herein, is 103. The numbers 103 and 102 represent the two connections to the selected trunk. The operator then again operates the switch elements 274 through 277 and 473 through 475 to the left-hand position causing the diode groups 003 and 350 to mark the two ends of the path through the switching network. In a similar manner, as described above, in reference to the marking of the transistor switching network by the diode groups 001 and 360, a path is selected through the switching network. For the purpose of illustration it is assumed that this path comprises the transistors 310, 311, 312 and 313. Upon the selection of this path potentials between the various transistors assume the values described above in reference to the first-described selected path so that this path in turn tests busy at each of the junctions between the various transistors. Other transistors connected to these selected transistors thereafter test busy upon the attempted breakdown thereof. When the operator restores the start key to its neutral position once again removing the batteries 278 and 476, the path comprising the transistors 310 through 313 remains functioning passing a current of approximately 8 milliamperes. The relays 117 and 354 similarly operate causing the busy lamps 120 and 355 to light and the calling lamp 219 to extinguish. The operator notes the lighting of these lamps and actuates the ringing key 221 to its ringing position or to the right to apply ringing current from the source 280 to the called subscriber's line 210.

When the called subscriber at the substation 210 answers, an operating path is closed through relay 216 causing it to operate. When relay 216 operates, it interrupts the circuit of the answering disconnect lamp 218 thus indicating to the operator that the called party has answered. The operator will thereupon cease to operate the ringing key 221 and will attempt to establish other paths through the switching equipment in response to other calls. The two subscribers are now in direct communication with each other and the battery 131 through the winding of relay 116 supplies talking battery to the subscriber's station 110 and relay 216 supplies therethrough talking battery 231 to the subscriber's station 210. The voice currents transmitted from station 110 travel through the subscriber's line and through the transmission coil 111, the primary coils of which are connected to each other by the capacitor 135, then through the lower right-hand winding 113, transistors 310 through 313, coils 351 and 361, transistors 323, 412, 418 and 414 through the winding 213 over the subscriber's line to station 210. The voice frequency currents from station 210 are transmitted over the same path in the reverse direction to the subscriber's station 110 and thus provide in this manner a complete two-way communication path between the two subscriber's stations.

The transmission path from the winding 213 is through the diode 264 and thereafter through the capacitor 222 to ground. The impedance of this path is sufficiently low so that only a small transmission loss is introduced into the circuit due to these elements. It should also be noted that the transformers 111 and 211, as well as the transformers 351 and 361, have an additional winding wound thereon connected to a pair of diodes or varistors. This additional winding, for example, the winding 112 of transformer 111, is connected through the diodes 115 and 114 to the positive and negative potential sources 134 and 133, respectively. The diodes 115 and 114 are oppositely poled to the biasing voltages of batteries 134 and 133 to operate as limiters for suppressing transient surges in the switching network which exceeds the bias limits provided for each of the rectifiers 115 and 114. The rectifiers 115 and 114 and related winding 112 thus reduce the effect of switching circuits upon the established voice frequency path and, in addition, limit to unobjectionable value any transients coming from the subscriber's station or at least over the subscriber's line which is of sufficient magnitude to possibly interfere with the operation of the switching network. Each of the transformers 111, 121, 351, 361, etc., as described above, has this limiting circuit associated therewith. In addition, the diodes or varistors 308, 309, 408 and 409 are connected serially in the third stage to the collectors of the transistors located therein. These diodes are necessary since the transistor switching network has high impedance in only one direction and not in both directions as a gas tube network. In the absence of the diodes 308, 309, 408 and 409 the batteries 482 and 481 would send current through the matching stage. If the emitters of the transistors 312, 322, 412 and 422 in the matching stage are good rectifiers, that is, have high back impedances, the diodes can be connected in the base circuits in series with the base resistances 312R, 322R, 412R and 422R. At the completion of the call each of the subscribers hangs up and interrupts the current flowing through the respective relays 116 and 216 causing these relays to release. Relay 116, upon releasing, completes a circuit for lighting the disconnect lamp 118 and the relay 216, upon releasing, completes a circuit for lighting the disconnect lamp 218. The busy lamps 120 and 220, however, continue to be energized or lighted at this time. The operator upon noting the lighted disconnect lamps 118 and 218 sets the selector switches 270 through 273 once again in accordance with one of these lines, as for example, 001 for line 210. The operator thereafter operates the start key consisting of the switches 274 through 277 to its disconnect or right-hand position.

When the switches 274 through 277 are actuated to the right the plus 12 volts from battery 278 are connected therethrough to the bus bars 281. The switch 277 is now effective and the switch 276 is not. The plus 12 volts are connected through the bus bars 281 to the release gates associated with the various line circuits and as shown in accordance with the setting of switches 270 through 273 specifically to the release gate consisting of diodes 246, 247 and 248. When the plus 12 volts are applied to the three input leads to the release gate, a square wave shaped pulse is present at the common point of the three diodes 246 through 248. On the portion of the square pulse when the pulse is going positive the gate looks into a differentiating circuit having a large time constant. The large time constant is caused by semiconductor diode 264 which is biased in its back direction. The effect of the large time constant will round off the pulse caused by this positive step. The amplitude of the positive pulse is also limited due to the clamping action of the diode 242 through the capacitor 245. The potential upon output lead 243 is thus substantially restricted to the normal plus 5-volt level. For the negative step at the end of the pulse the time constant is low since the diode 264 is now biased in its forward conducting direction. This step is therefore differentiated into a sharp negative pulse of approximately 3 volts which is capable of releasing the path through the switching network terminated at this line circuit, as is hereinafter described. The release gate and differentiating circuit may be designated as a polarization sensitive differentiating circuit.

The negative pulse from the release gate and differentiating circuit, as described above, is connected in the specific embodiment disclosed herein to the emitter of the transistor 414 causing it to return to normal. The potential upon the collector of transistor 414 thereupon decreases to its normal minus 3 volts due to battery 483 causing the transistor 418 in turn to stop conducting. When the transistor 418 returns to normal its collector potential reduces to minus 5 volts causing the transistor 412 to return to normal. The transistor 412 in a similar manner causes the transistor 323 to release. The operator, after releasing the start key, resets the selector switches 270 through 273 in accordance with the line 110. The operation thereafter of the start key reduces the voltages applied to the selected path consisting of transistors 310, 311, 312 and 313, described above, causing it to release and restore to its idle condition.

Various modifications are possible without departing from the spirit of the invention, as for example, it is not necessary to have the release gates at the line end since they could be located as well at the trunk end and the release of the switching network would commence therefrom. While the manner of operating the system has been described with reference to four subscribers' lines and two intraoffice trunks, the same principles and mode of operation apply to large comprehensive telephone switching arrangements.

It is also not necessary to utilize the specific two-terminal transistor cross-point disclosed herein as long as the transistor circuit has a collector-to-emitter current ratio greater than one and preferably a high back impedance. For example, the transistor circuits disclosed in the application Serial No. 300,235 to J. J. Ebers, filed on July 22, 1952, which issued on October 13, 1953 as Patent 2,655,610 and the application Serial No. 300,220 to W. Shockley, filed on July 22, 1952, which issued on October 13, 1953 as Patent 2,655,609 can be utilized. Utilizing transistor cross-points having a high back impedance would obviate the necessity for the diodes 308, 309, 408 and 409.

It is to be understood therefore that the above-described arrangements are illustrative of the application of the principles of this invention and that still further arrangements may be devised by those skilled in the art without departing from the spirit and scope of the invention.

What is claimed is:

1. In a telephone switching system comprising lines and trunks and a transistor switching network for establishing talking connections between lines and trunks; a line information register variably settable to register the identity of any one of said lines; a trunk information register variably settable to identify any one of said trunks to which a line is to be connected; diode gates, one for each trunk and one for each line; and means comprising the gate of an identified line and the gate of an identified trunk for causing said transistor network to establish a talking connection between the identified line and trunk.

2. In a telephone system comprising lines and trunks; means for marking any one of said lines; means for marking any one of said trunks to which it is desired that a marked line be connected for conversation therebetween; a transistor switching network constituting a plurality of normally disabled talking channels between said lines and trunks; and gating means individual to each line and each trunk for enabling one of said disabled channels between a marked line and a marked trunk comprising a plurality of diodes.

3. In a telephone switching system in combination, a plurality of telephone lines; a switching network interconnecting said lines comprising a plurality of transistor cross-points and a selectable terminal for each of said lines; selecting means for selecting and applying marking potentials to some of said terminals comprising diode number groups; and means for applying interrupting potentials to said selected terminals comprising diode differentiating circuits.

4. In a telephone system comprising lines and trunks; means for marking any one of said lines; means for marking any one of said trunks to which it is desired that a marked line be connected for conversation therebetween; a transistor switching network constituting a plurality of normally disabled talking channels between said lines and trunks; gating means individual to each line and each trunk for enabling one of said disabled channels between a marked line and a marked trunk comprising a plurality of germanium diodes; and gating means individual to each trunk for disabling said enabled channel comprising a plurality of diodes.

5. In a telephone system comprising lines and trunks; means for marking any one of said lines; means for marking any one of said trunks to which it is desired that a marked line be connected for conversation therebetween; a switching network constituting a plurality of normally disabled talking channels between said lines and trunks; gating means individual to each line and each trunk for enabling one of said channels between a marked line and a marked trunk comprising a plurality of diodes and a resistor shunting one of said diodes; and gating means individual to each trunk for disabling said enabled channel comprising a plurality of diodes and a capacitor serially connected with each of said diodes in said disabling gating means.

6. A number group circuit for marking a terminal of a transistor switching network comprising a plurality of input leads; a diode for each of said input leads similarly poled with respect to said input leads; an output lead connected to each of said diodes; and a resistor connecting said output lead with one of said input leads.

7. A number group circuit for marking a terminal of a switching network comprising a plurality of input leads; a diode for each of said input leads similarly poled with respect to said input leads; an output lead connected to each of said diodes; and a resistor connecting said output lead with one of said input leads having a resistance that is relatively small with respect to the back resistance of said diodes and relatively large with respect to the forward resistance of said diodes.

8. In a telephone system comprising lines and trunks; means for marking any one of said lines; means for marking any one of said trunks to which it is desired that a marked line be connected for conversation therebetween; a transistor switching network constituting a plurality of normally disabled talking channels between said lines and trunks; and gating means individual to each line and each trunk for enabling one of said channels between a marked line and a marked trunk comprising a plurality of input leads, a diode for each of said input leads similarly poled with respect to said input leads, an output lead connected to each of said diodes; and a resistor connecting said output lead with one of said input leads having a resistance that is relatively small with respect to the back resistance of said diodes and relatively large with respect to the forward resistance of said diodes.

9. A control circuit for a transistor switching network comprising a plurality of line and trunk selector switches; a plurality of line and trunk circuits; a gating circuit for each line and each trunk; and means including said selector switches and gating circuits for selecting a path through said transistor switch network from one of said lines to one of said trunks.

10. In combination a transistor switching network; a plurality of line number groups and a plurality of trunk number groups for marking said network; means responsive to said line number and trunk number groups for providing a path through said network; and a polarity sensitive trunk differentiating circuit for releasing an established path through said network, each of said line and trunk number groups and said differentiating circuit comprising a plurality of rectifying units.

11. In combination a talking path switching network having a plurality of inlets and outlets; a marking gate for each inlet and each outlet comprising a plurality of diodes and a shunting resistor for one of said diodes; and a release gate for each outlet comprising a plurality of diodes and a serially connected differentiating capacitor.

12. In combination a talking path switching network having a plurality of inlets and outlets; a marking gate for each inlet and outlet and a release gate for each outlet, each of said marking and release gates comprising a plurality of diodes, said marking gates comprising a shunting resistor for one of said diodes, said release gate comprising a serially connected capacitor; means for providing a marking pulse through said marking gates; and a differentiating circuit for each of said outlets; means including said release gates and said differentiating gates whereby a pulse is provided to said outlets of opposite polarity to the pulse supplied through said marking gates by said marking pulse providing means.

13. A telephone system comprising a transistor switching networks having a plurality of transistor cross-points, and means whereby combinations of said cross-points form paths through said network; and a low voltage control system comprising a plurality of marking diode gates, a plurality of release diode gates, a potential source for supplying a voltage substantially equal to the breakdown potential for said paths through said release gates and through said marking gates to said network, and a potential source for supplying a voltage substantially equal to the sustaining potential for said paths through said marking gates to said network.

14. A telephone system comprising a transistor switching network having a plurality of transistor cross-points, and means whereby combinations of said cross-points form paths through said network; and a low voltage control system comprising a plurality of marking diode gates, a plurality of release diode gates, a potential source for supplying a voltage substantially equal to the breakdown potential for said paths to said release gates and through said marking gates to said network, and a potential source for supplying a voltage substantially equal to the sustaining potential for said paths through said marking gates to said network, each of said marking and release gates comprising a plurality of diodes, said marking gates comprising a shunting resistor for one of said diodes and said release gates comprising a serially connected capacitor.

15. A polarization differentiating release circuit for providing a sharp release pulse of predetermined polarity comprising a plurality of input leads; means for providing a substantially square-shaped pulse of a polarity opposite to said predetermined polarity to each of said input leads; a plurality of diodes connected respectively in their high impedance direction to said input leads; a common terminal connected to said diodes; a differentiating capacitor connected to said common terminal; a diode biasing circuit for providing together with said capacitor relatively large time-constant operation at the beginning of said square-shaped pulse and relatively small time-constant operation at the end of said square-shaped pulse having a diode connected in its high impedance direction to said capacitor, and biasing means for biasing said diode in its high impedance direction; an output lead connected to said capacitor and maintained normally at a potential of polarity opposite to said predetermined polarity by said biasing means; and a diode clamping circuit connected to said output lead for limiting the amplitude of pulses of a polarity opposite to said predetermined polarity through said output lead.

16. In a telephone system comprising lines and trunks, a switching network constituting a plurality of normally disabled talking channels between said lines and said trunks, marking gating means individual to each of said lines and each of said trunks for enabling one of said channels comprising a plurality of marking input leads, selecting means for providing a start pulse to each of said marking input leads, a plurality of marking diodes connected respectively in their high impedance direction for said start pulse to said marking input leads, an output lead connected to each of said marking diodes and to said switching network, a resistor connecting said output lead with one of said marking input leads having a resistance that is relatively small with respect to the high impedance of said marking diodes and relatively large with respect to the forward impedance of said marking diodes; and a polarization differentiating release circuit individual to each of said lines for providing a release pulse of a polarity opposite to that provided by said marking gating means comprising a plurality of release input leads, selecting means for connecting said release input leads to said pulse providing means of said marking gating means, a plurality of release diodes connected respectively in their high impedance direction to said release input leads, a common terminal connected to said release diodes, a differentiating capacitor connected to said common terminal and also to said output lead in said marking gating means, a diode biasing circuit for providing together with said capacitor relatively large time-constant operation at the beginning of a pulse from said pulse providing means and relatively small time-constant operation at the end of said pulse having a biasing diode connected in its high impedance direction to said capacitor, and biasing means for biasing said diode in its high impedance direction and for normally maintaining said output lead at a potential of a polarity similar to the polarity of the pulse provided by said marking gating means and a diode clamping circuit including said marking diodes for limiting the amplitude of pulses of a polarity similar to the polarity of the pulses provided by said marking gating means during the release operation.

References Cited in the file of this patent

UNITED STATES PATENTS

| | | |
|---|---|---|
| 2,684,405 | Bruce et al. | July 20, 1954 |